(12) United States Patent
Yonezawa

(10) Patent No.: US 7,929,485 B2
(45) Date of Patent: Apr. 19, 2011

(54) HOME AGENT AND MOBILE COMMUNICATION SYSTEM

(75) Inventor: Masaaki Yonezawa, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 1261 days.

(21) Appl. No.: 11/371,903

(22) Filed: Mar. 10, 2006

(65) Prior Publication Data

US 2006/0215631 A1 Sep. 28, 2006

(30) Foreign Application Priority Data

Mar. 14, 2005 (JP) ................ P. 2005-070253

(51) Int. Cl.
*H04W 4/00* (2009.01)
(52) U.S. Cl. ......... 370/328; 370/331; 370/338; 370/356
(58) Field of Classification Search .......... 370/351, 370/338, 331, 328, 336; 455/453
See application file for complete search history.

(56) References Cited

U.S. PATENT DOCUMENTS

| | | | |
|---|---|---|---|
| 6,496,505 B2 * | 12/2002 | La Porta et al. | 370/392 |
| 6,987,771 B2 * | 1/2006 | Shimizu et al. | 370/401 |
| 7,069,015 B2 * | 6/2006 | Veerepalli et al. | 455/453 |
| 7,313,128 B2 * | 12/2007 | Andersen et al. | 370/351 |
| 7,342,916 B2 * | 3/2008 | Das et al. | 370/351 |
| 2002/0080752 A1 * | 6/2002 | Johansson et al. | 370/338 |
| 2005/0020265 A1 | 1/2005 | Funabiki et al. | |
| 2005/0259631 A1 * | 11/2005 | Rajahalme | 370/351 |

FOREIGN PATENT DOCUMENTS

| | | |
|---|---|---|
| JP | 2002-176446 B2 | 6/2002 |
| JP | 2002-271368 B2 | 9/2002 |
| JP | 2004-7578 A | 1/2004 |

OTHER PUBLICATIONS

Fukunaga, Y., "Mobile & Wireless Mobile IP opening the door of ubiquitous computing", Computer World, Jan. 2004, pp. 148-153, vol. 1, No. 1.
Sawai, A., et al., "Study on selection of Route Optimization in Mobile IP", Research Report of Information Processing Society of Japan, Nov. 2001, pp. 79-86, 2001-H1-96-11, 2001-MBL-19-11.
Japanese Office Action issued in counterpart Japanese Application No. 2005-070253 dated Nov. 10, 2009.

* cited by examiner

*Primary Examiner* — Lester Kincaid
*Assistant Examiner* — Isaak R Jama
(74) *Attorney, Agent, or Firm* — Sughrue Mion, PLLC

(57) ABSTRACT

A home agent receives a communication packet sent out from a source terminal to a mobile terminal as a destination to transfer the communication packet to the mobile terminal connected to a foreign network. This home agent requests the mobile terminal, based on a measured result of internal resources, to bypass the home agent to perform a communication with a source terminal.

11 Claims, 5 Drawing Sheets

US 7,929,485 B2

HOME AGENT AND MOBILE COMMUNICATION SYSTEM

CROSS-REFERENCE TO RELATED APPLICATIONS

This application is based upon and claims the benefit of priority from the prior Japanese Patent Applications No. 2005-070253, filed on Mar. 14, 2005, the entire contents of which are incorporated herein by reference.

BACKGROUND OF THE INVENTION

1. Field of the Invention

The present invention relates to a home agent for receiving a communication packet that is sent out to a home address of a mobile terminal as a destination and then transferring this communication packet to a mobile terminal connected to a foreign network and a mobile communication system using this home agent and, more particularly, a home agent and a mobile communication system capable of achieving improvement in a performance of an overall mobile communication system.

2. Description of the Related Art

FIG. 3 is a view showing a configuration of the mobile communication system in the related art (See JP-B-3496641 and JP-B-3601464, for example.). In FIG. 3, mobile terminals (each also called a mobile node (MN)) 10(1) to 10(3) can be carried with the user, and a subnetwork to be connected is changed following upon the movement of the mobile terminals 10(1) to 10(3). Also, the mobile terminals 10(1) to 10(3) conform to a communication protocol MIPv6 (Mobile Internet Protocol version 6), and have a mobile node function in the so-called mobile IP respectively. Then, the mobile terminals 10(1) to 10(3) have a route optimizing section Rt1 that optimizes a communication route respectively.

Also, communication destination terminals (each also called a correspondent node (CN)) 20(1) to 20(3) have a route optimizing section Rt2 respectively, and perform communication with the mobile terminals 10(1) to 10(3). The route optimizing section Rt2 optimizes the communication route in answer to the request from the route optimizing section Rt1 of the mobile terminals 10(1) to 10(3).

A home network HN is a subnetwork to which the mobile terminals 10(1) to 10(3) are connected originally. Also, foreign networks FN1 to FN3 are subnetworks to which the mobile terminals 10(1) to 10(3) moved from the home network HN are connected actually.

In FIG. 3, by way of example, the mobile terminal 10(1) is connected to the foreign network FN1, the mobile terminal 10(2) is connected to the foreign network FN2, and the mobile terminal 10(3) is connected to the foreign network FN3. In this case, various nodes such as other terminals, routers, servers, etc. other than the mobile terminals 10(1) to 10(3) are present in the home network HN and the foreign networks FN1 to FN3, but their illustration is omitted herein.

A home agent (HA) 30 includes a transiting section 31 and internal resources 32, and operates on the node in the home network HN. Also, the home agent 30 conforms to the MIPv6, and controls and relays the communication among a plurality of terminals 10(1) to 10(3) and 20(1) to 20(3) by using functions provided by the MIPv6.

The transiting section 31 receives the communication packet being sent out to the mobile terminals 10(1) to 10(3) from the communication destination terminals 20(1) to 20(3) when the mobile terminals 10(1) to 10(3) stay in the foreign networks FN1 to FN3, and transfers the communication packet to the mobile terminals 10(1) to 10(3). Conversely the transiting section 31 receives the communication packet being sent out to the communication destination terminals 20(1) to 20(3) from the mobile terminals 10(1) to 10(3), and transfers the communication packet to the communication destination terminals 20(1) to 20(3). The internal resources 32 are registers, memories, and the like used for data processing, computing, data storing, etc. in the transiting section 31 and the home agent 30.

A backbone network 100 consists of the IP network, the Internet, or the like, for example. The home network HN, the foreign networks FN1 to FN3, and the communication destination terminals 20(1) to 20(3) are connected to the backbone network 100.

In this case, the home address and the care of address are allocated to the mobile terminals 10(1) to 10(3). The home address gives the address that is allocated uniquely to the mobile terminals 10(1) to 10(3) independent of the subnetwork, and gives the same network address as that in the home network HN. The care of address gives the address that is allocated to the foreign networks FN1 to FN3.

Then, the home agent 30 stores the home address and the care of address of the mobile terminals 10(1) to 10(3) in its memory (not shown) to correlate with each other. Accordingly, the transiting section 31 transfers the received packet based on the correlation of the address stored in the memory.

Also, the communication destination terminals 20(1) to 20(3) store in advance only the home addresses of the mobile terminals 10(1) to 10(3) in their memories (not shown).

An operation of such system will be explained with reference to FIG. 4 and FIG. 5 hereunder.

An operational example in which the communication destination terminal 20(1) performs communication with the mobile terminal 10(1), the communication destination terminal 20(2) performs communication with the mobile terminal 10(2), and the communication destination terminal 20(3) performs communication with the mobile terminal 10(3) will be explained herein.

In getting into communication with the mobile terminal 10(1), at first the communication destination terminal 20(1) sends out the communication packet to the home address of the mobile terminal 10(1) as the destination. That is, the communication destination terminal 20(1) sends out the packet to the home agent 30. Then, the transiting section 31 of the home agent 30 receives the packet, and then transfers the packet to the mobile terminal 10(1) (L1 in FIG. 4). In this case, because the transiting section 31 executes the transiting process, the internal resources 32 of the home agent 30 are used.

Then, in getting into communication with the mobile terminal 10(2), at first the communication destination terminal 20(2) sends out the communication packet to the home agent 30. Then, the transiting section 31 of the home agent 30 transfers the communication packet to the mobile terminal 10(2) (L2 in FIG. 4). In this case, because the transiting section 31 executes the transiting process, the internal resources 32 of the home agent 30 are further used. Thus, there are not sufficient resources to carry out newly the transiting process.

In addition, in getting into communication with the mobile terminal 10(3), at first the communication destination terminal 20(3) sends out the communication packet to the home agent 30. In this case, because the internal resources 32 of the home agent 30 are insufficient, the transiting section 31 cannot execute the transiting process and thus the home agent 30 cannot receive the communication packet (L3 in FIG. 4).

In contrast, when the communication is held between the communication destination terminal 20(1) and the communication destination terminal 20(2), the route optimizing section Rt1 of the mobile terminals 10(1), 10(2) request the route optimizing section Rt2 of the communication destination terminals 20(1), 20(2) to use the communication route bypassing the home agent.

Then, the mobile terminals 10(1), 10(2) send out the care of address to the communication destination terminals 20(1), 20(2). Then, the route optimizing section Rt1, Rt2 cooperate with each other to get mutual authorizations, or the like, and then select the communication route bypassing the home agent 30. Thus, the terminals 10(1), 10(2), 20(1), 20(2) perform the communication directly via the selected route (L4, L5 in FIG. 5). Accordingly, there is no need for the transiting section 31 to execute the transiting process of the communication packet, and thus the internal resources 32 become free.

Further, in getting into communication with the mobile terminal 10(3), at first the communication destination terminal 20(3) sends out the communication packet to the home agent 30. At this time, because the home agent 30 has the internal resources 32 enough and to spare, the transiting section 31 of the home agent 30 transfers the communication packet to the mobile terminal 10(3) (L6 in FIG. 5)

JP-B-3496641 and JP-B-3601464 are referred to as related art.

In this manner, once the communication is held between the terminals 10(1) to 10(3), 20(1) to 20(3) via the transiting section 31 of the home agent 30, the route optimizing section Rt1, Rt2 of the terminals 10(1) to 10(3), 20(1) to 20(3) switch the route not to pass through the home agent 30. Therefore, the internal resources 32 of the home agent 30 are recovered.

However, the route optimizing section Rt1 of the terminals 10(1) to 10(3) decide independently whether or not such route optimizing section Rt1 request the route optimizing section Rt2 of the communication destination terminals 20(1) to 20(3) to optimize the route, based on the states of own terminals 10(1) to 10(3), a situation of the backbone network 100, and the like, and are not affected by a situation of the internal resources 32 of the home agent 30. Therefore, such a situation is caused that the transiting section 31 cannot execute newly the transiting process because of a lack of the internal resources 32 of the home agent 30. As a result, such a problem existed that the performance of the overall mobile communication system and thus a communication efficiency is lowered.

SUMMARY OF THE INVENTION

An object of the present invention is to provide a home agent and a mobile communication system capable of achieving an improvement of performance of the overall mobile communication system.

The invention provides a home agent for receiving a communication packet sent out from a source terminal to a mobile terminal as a destination to transfer the communication packet to the mobile terminal connected to a foreign network, wherein the home agent requests the mobile terminal, based on a measured result of internal resources, to bypass the home agent to perform a communication with the source terminal.

The invention also provides a home agent for receiving a communication packet sent out from a source terminal to a mobile terminal as a destination to transfer the communication packet to the mobile terminal connected to a foreign network, wherein the home agent requests the mobile terminal, based on a route cost of a network, to bypass the home agent to perform a communication with the source terminal.

The invention also provides a home agent for receiving a communication packet sent out from a source terminal to a mobile terminal as a destination to transfer the communication packet to the mobile terminal connected to a foreign network, wherein the home agent requests the mobile terminal based on at least any one of a measured result of internal resources and a route cost of a network, to bypass the home agent to perform a communication with the source terminal.

The home agent includes:

a measuring section which measures the internal resources a deciding section which decides whether or not it is possible to make a new transfer, based on a measured result acquired by the measuring section, and a requesting section which requests the mobile terminal, based on a result of deciding by the deciding section, to bypass the home agent to perform the communication with the source terminal.

The home agent includes:

a route cost acquiring section which acquires a route cost, a deciding section which decides a switching of a route based on the route cost acquired by the route cost acquiring section, and a requesting section which requests the mobile terminal, based on a result of deciding by the deciding section, to bypass the home agent to perform the communication with the source terminal.

The invention also provides a mobile communication system, having:

a home agent which receives a communication packet sent out from a source terminal to a mobile terminal as a destination to transfer the communication packet to the mobile terminal connected to a foreign network, and a mobile terminal which performs a communication with the source terminal, wherein the home agent requests the mobile terminal, based on a measured result of internal resources, to bypass the home agent to perform a communication with the source terminal, and the mobile terminal bypasses the home agent to perform the communication with the source terminal when the mobile terminal receives the request from the home agent.

In the mobile communication system, the home agent has:

a measuring section which measures the internal resources, a deciding section which decides whether or not it is possible to make a new transfer, based on a measured result acquired by the measuring section, and a requesting section which requests the mobile terminal, based on a result of deciding by the deciding section, to bypass the home agent to perform the communication with the source terminal.

The invention also provides a mobile communication system, having:

a home agent which receives a communication packet sent out from a source terminal to a mobile terminal as a destination to transfer the communication packet to the mobile terminal connected to a foreign network, a memory which stores route management information, and a route cost calculating section which calculates a route cost based on the route management information, wherein the home agent requests the mobile terminal, based on a route cost of a network acquired by the route cost calculating section, to bypass the home agent to perform a communication with the source terminal, and a mobile terminal which bypasses the home agent to perform the communication with the source terminal when the mobile terminal receives the request from the home agent.

In the mobile communication system, the home agent has:

a route cost acquiring section which acquires a route cost, a deciding section which decides a switching of a route based on the route cost acquired by the route cost acquiring section, and a requesting section which requests the mobile terminal, based on a result of deciding by the deciding section, to bypass the home agent to perform the communication with the source terminal.

In the mobile communication system, the mobile terminal has:

a request receiving section which receives the request from the home agent, and a route optimizing section which selects an optimal communication route bypassing the home agent in response to the received request.

According to the home agent and the mobile communication system, the following advantages can be achieved.

The home agent measures the internal resources, and then requests the mobile terminal to bypass the home agent to perform the communication with the source terminal based on the measured result of the internal resources. Therefore, such a situation can be avoided that the mobile terminal cannot accept the new communication establishing request from the source terminal because of a lack of the internal resources of the home agent. As a result, such a situation can be reduced that a waiting time for the new communication establishing request is generated, and thus an improvement in performance of the overall mobile communication system can be achieved and a communication efficiency can be increased.

The home agent requests the mobile terminal to bypass the home agent to perform the communication with the source terminal based on the route cost of the network. Therefore, there is no need to transit the communication packet between the mobile terminal and the source terminal, and thus a route cost of the route used in the transition can be reduced. Also, such a situation can be avoided that the home agent cannot accept the new communication establishing request from the source terminal because of a jam of the route. As a result, such a situation can be decreased that a waiting time for the new communication establishing request is generated, and thus an improvement in performance of the overall mobile communication system can be achieved and a communication efficiency can be increased.

DETAILED DESCRIPTION OF THE PREFERRED EMBODIMENTS

Embodiments of the present invention will be explained with reference to the drawings hereinafter.

First Embodiment

Figure 1:
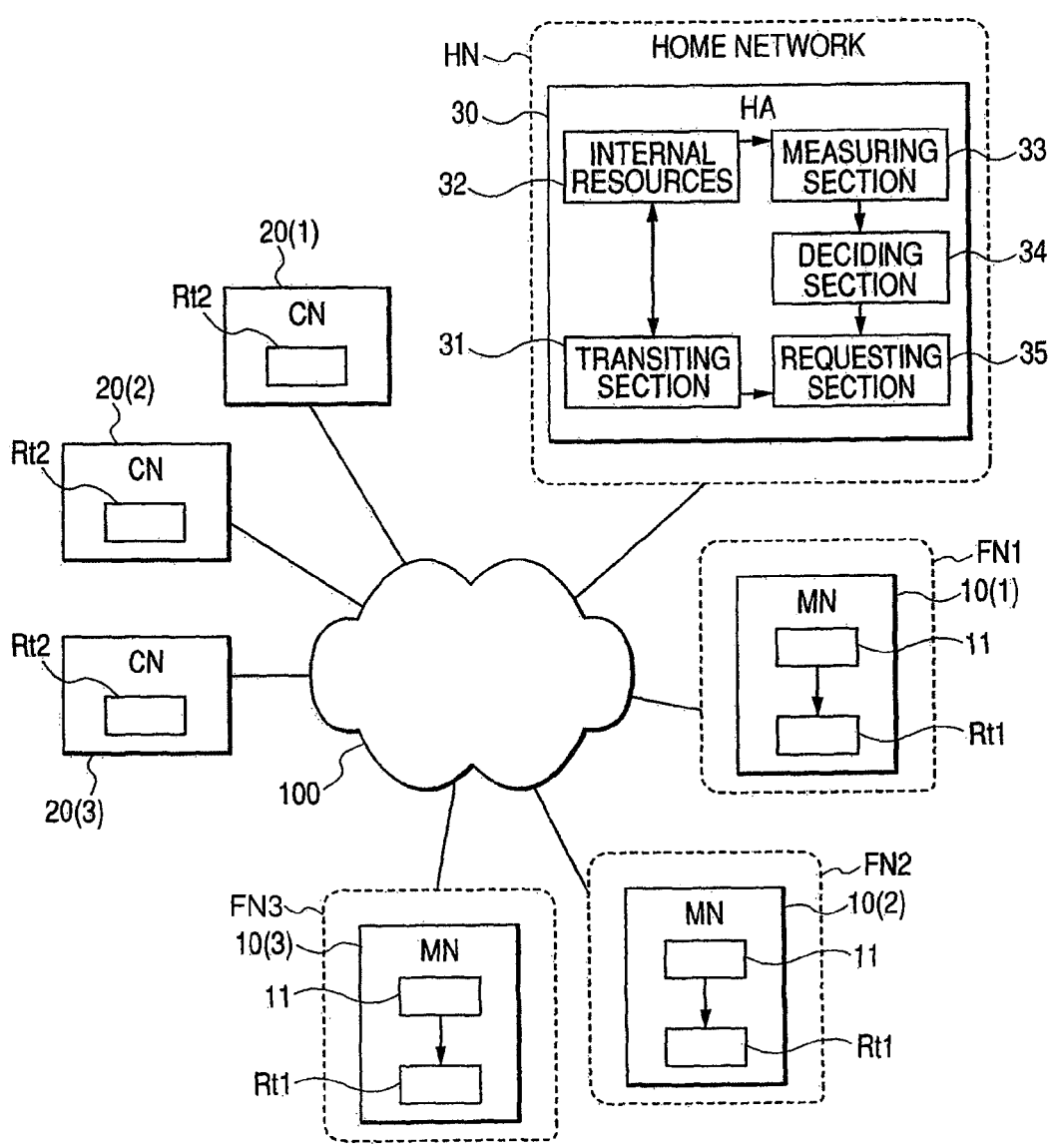
FIG. 1 is a configurative view showing a first embodiment of the present invention.
Figure 3:
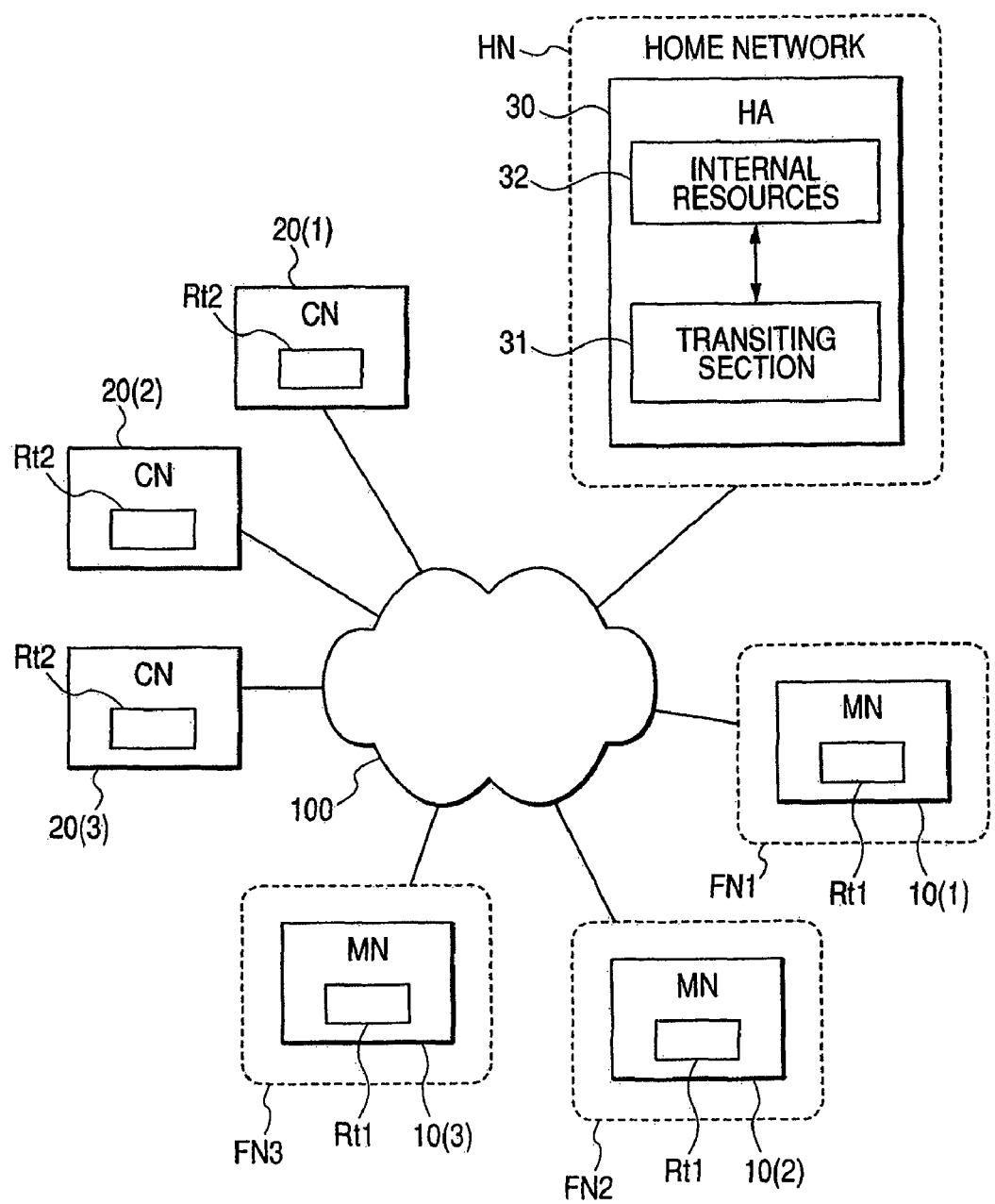
FIG. 3 is a view showing a configuration of the mobile communication system in the related art.
Figure 4:
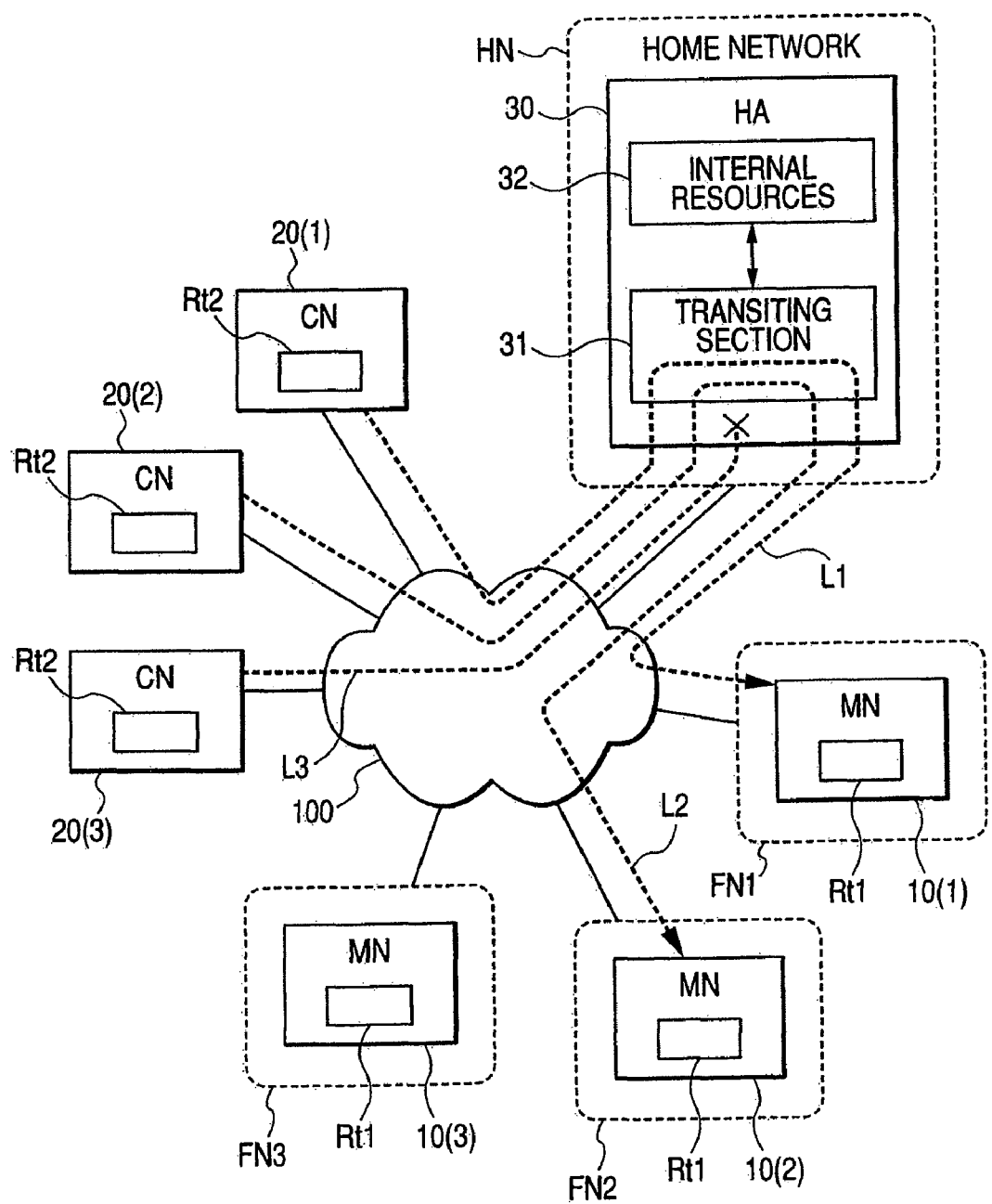
FIG. 4 is a view showing the configuration of the mobile communication system in the related art.
Figure 5:
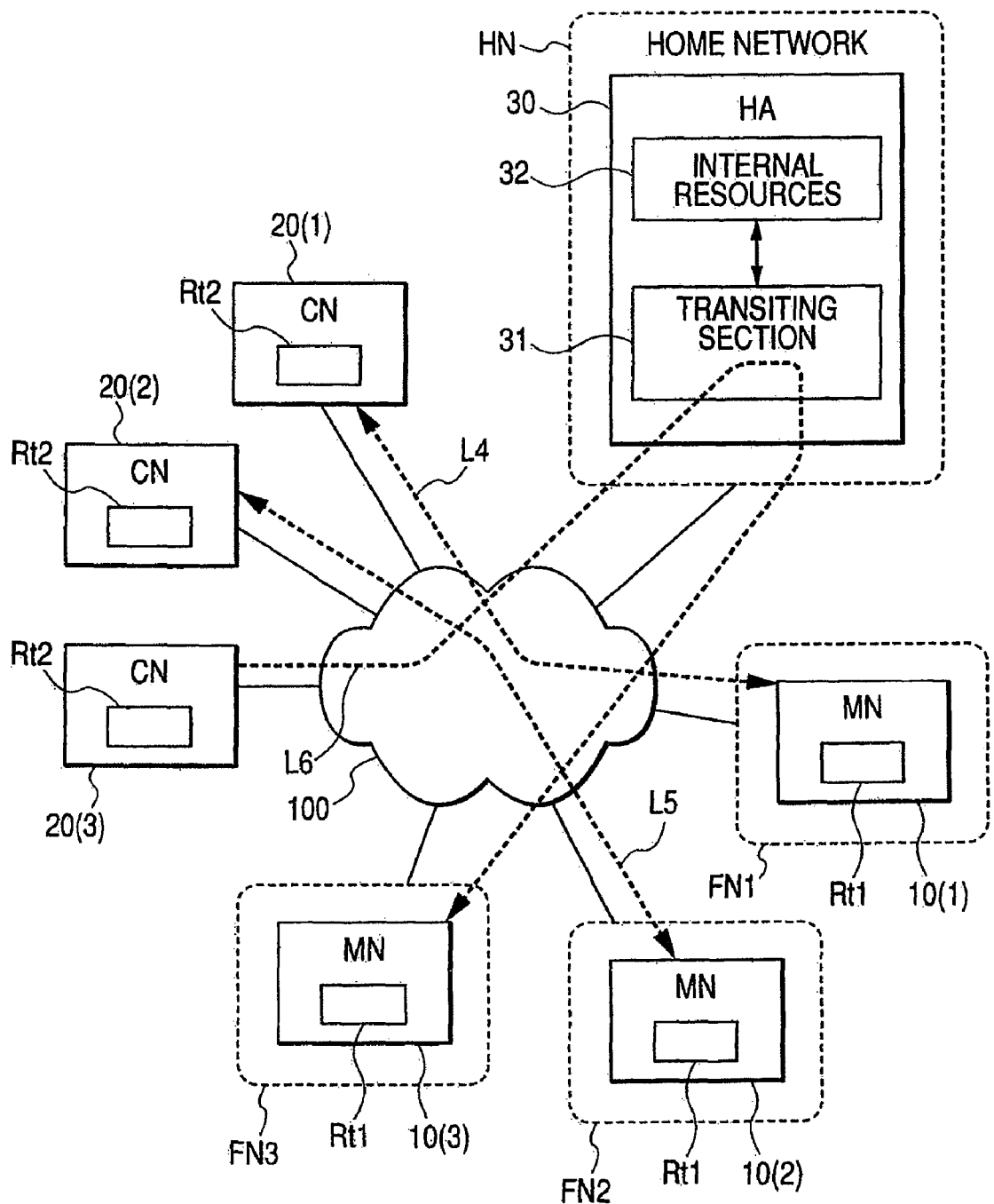
FIG. 5 is a view showing the configuration of the mobile communication system in the related art.

FIG. 1 is a configurative view showing a first embodiment of the present invention. Here, the same symbols are affixed to the same elements as those in FIG. 3 and their explanation will be omitted herein. In FIG. 1, a measuring section 33, a deciding section 34, and a requesting section 35 are provided newly to the home agent 30.

The measuring section 33 measures an amount of resources in the internal resources 32. The measured result of the measuring section 33 is input into the deciding section 34. The measured result of the deciding section 34 is input into the requesting section 35. Then, the requesting section 35 requests the mobile terminals 10(1) to 10(3) to bypass the home agent 30 to communicate with the communication destination terminal.

Also, a request receiving section 11 is provide newly to the mobile terminals 10(1) to 10(3) respectively. The request receiving section 11 causes the route optimizing section Rt1 to optimize the route in response to the request from the requesting section 35 of the home agent 30.

An operation of such system will be explained hereunder.

The measuring section 33 measures an amount of resources in the internal resources 32. Here, the internal resources 32 are consumed not only by the transiting section 31 but also by the processes such as a process of receiving the notice of the care of address from the mobile terminals 10(1) to 10(3), and others.

Then, the deciding section 34 decides whether or not an amount of resources enough to execute the transiting process by the transiting section 31 still remains, based on the measured result of the measuring section 33. That is, the deciding section 34 decides whether or not the transiting section 31 can accept the new communication starting request from the communication destination terminals 20(1) to 20(3) and execute the transferring process of the communication packet.

Then, the requesting section 35 requests the mobile terminals 10(1) to 10(3), which are performing the communication by using the transiting section 31, to optimize the route according to the decision result of the deciding section 34. Of course, the requesting section 35 requests the optimization of the route when it is decided that an amount of resources is insufficient. Then, the requesting section 35 does not request the optimization of the route when it is decided that an amount of resources is not insufficient.

The mobile terminals 10(1) to 10(3) in the foreign networks FN1 to FN3 receive the request from the home network HN via the backbone network 100, and the request receiving section 11 instructs the route optimizing section Rt1 to optimize the route in compliance with the received request. In other words, the route optimizing section Rt1 request the route optimizing section Rt2 of the communication destination terminals 20(1) to 20(3) to optimize the route, the route optimizing section Rt1, Rt2 cooperate with each other to get mutual authorizations, or the like, and then select the communication route bypassing the home agent 30. Thus, the terminals 10(1), 10(2), 20(1), 20(2) perform directly the communication via the selected route. Accordingly, the internal resources 32 of the home agent 30 become free. Here, since operations except the above operations are similar to those of the system shown in FIG. 3, their explanation will be omitted herein.

In this manner, the measuring section 33 measures an amount of internal resources of the home agent 30, and then the requesting section 35 requests the mobile terminals 10(1) to 10(3) to optimize the route when an amount of consumed resources exceeds a predetermined amount. Therefore, such a situation can be avoided that the mobile terminals 10(1) to 10(3) cannot accept the new communication establishing request from the communication destination terminals 20(1) to 20(3) because of a lack of the internal resources 32 of the home agent 30. As a result, such a situation can be decreased that a waiting time for the new communication establishing request is generated, and thus an improvement in performance of the overall mobile communication system can be achieved and a communication efficiency can be increased.

Second Embodiment

Figure 2:
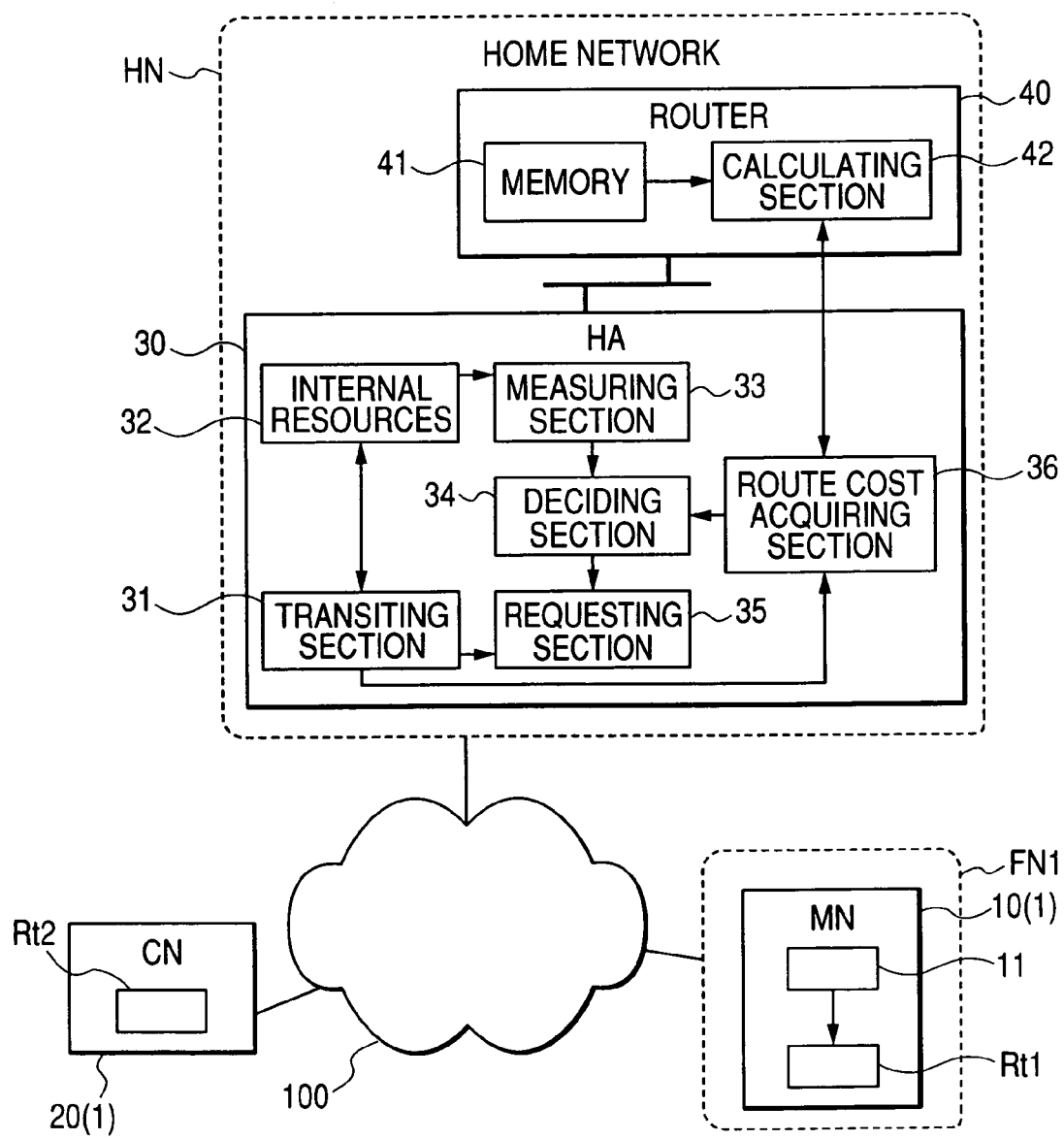
FIG. 2 is a configurative view showing a second embodiment of the present invention.

FIG. 2 is a configurative view showing a second embodiment of the present invention. Here, the same symbols are affixed to the same elements as those in FIG. 3 and their explanation will be omitted herein, and also illustrations of the foreign networks FN2, FN3 and the communication destination terminals 20(2), 20(3) are omitted herein. In FIG. 2, a router 40 connected to the home agent 30 is provided newly to the home network HN. The router 40 has a memory 41 and a route cost calculating section 42, and then decides through what routes in the home network HN, the foreign networks FN1 to FN3, and the backbone network 100 the communication packet should be transferred. The memory 41 acts as a route management information storing section with a routing table, and stores route management information (information such as the number of taken routers (the number of hops), line speed, reliability, monetary obligation every route, and the like). The route cost calculating section 42 calculates a route cost from the route management information in the memory 41.

Also, a route cost acquiring section 36 is provided to the home agent 30. The route cost acquiring section 36 gets a route cost from the route cost calculating section 42 of the router 40, and then outputs the cost to the deciding section 34.

An operation of such system will be explained hereunder.

The route cost acquiring section 36 checks the mobile terminal 10(1) to 10(3) that are transited by the transiting section 31, and reads the care of address stored in a memory (not shown). Then, the route cost acquiring section 36 requests the route cost calculating section 42 of the router 40 to send out the information of route cost for the care of address. Accordingly, the route cost calculating section 42 of the router 40 reads the route management information in the memory 41. Then, the route cost calculating section 42 calculates a route cost of respective routes (for example, the route passing through the home agent, the route not passing through the home agent, etc.) for the care of address of the mobile terminal 10(1) to 10(3) based on the read route management information, and then sends out the calculated route cost to the route cost acquiring section 36.

Then, the route cost acquiring section 36 outputs the received route cost to the deciding section 34. The deciding section 34 compares respective route costs mutually and decides whether or not optimization of the route should be applied.

Then, the requesting section 35 requests the mobile terminals 10(1) to 10(3), which are communicating by using the transiting section 31, to optimize the route based on the decision result of the deciding section 34. Of course, the optimization of the route is requested when the better route cost (it is considered that the route is more effective if the route cost is lower) can be obtained by applying the optimization of the route, while the optimization of the route is not requested when the better route cost is obtained via the home agent 30. Since the operations other than the above operations are similar to those in the system shown in FIG. 1, their explanation will be omitted herein.

In this fashion, the deciding section 34 decides a switching of the communication route, based on the route cost calculated by the route cost calculating section 42. Then, the requesting section 35 requests the mobile terminals 10(1) to 10(3) based on the decision results to optimize the route, and causes the terminals 10(1) to 10(3), 20(1) to 20(3) to switch the routes between the terminals. Therefore, there is no need for the home agent 30 to transit the communication packet between the mobile terminals 10(1) to 10(3) and the communication destination terminals 20(1) to 20(3), and thus a route cost of the route used in the transition can be reduced. As a result, the performance of the overall mobile communication system can be improved, and a communication efficiency can be increased. Also, a financial cost of the overall mobile communication system generated due to the communication can be suppressed.

Also, even though the enough internal resources 32 still remain, sometimes the home agent 30 cannot accept the communication request when the route to the home agent 30 has heavy traffic. In this event, the deciding section 34 decides the switching of the communication route based on the route cost calculated by the route cost calculating section 42. Then, the requesting section 35 requests the mobile terminals 10(1) to 10(3) to optimize the route based on the decision result and then causes the terminals 10(1) to 10(3), 20(1) to 20(3) to switch the routes between the terminals, and thus the more effective routes can be selected. Therefore, such a situation can be avoided that the home agent 30 cannot accept the new communication establishing request because of a congestion of the route. As a result, such a situation can be decreased that a waiting time for the new communication establishing request is generated, and thus an improvement in performance of the overall mobile communication system can be achieved and a communication efficiency can be increased.

Here, the present invention is not limited to the above, and followings configurations may be employed.

In the mobile communication systems shown in FIG. 1 and FIG. 2, the mobile terminals 10(1) to 10(3), the communication destination terminals 20(1) to 20(3), the foreign networks FN1 to FN3 may be provided in any number.

Also, in the mobile communication systems shown in FIG. 1 and FIG. 2, the mobile terminals 10(1) to 10(3) may establish the communication mutually via the home agent 30.

Also, in the mobile communication system shown in FIG. 2, the deciding section 34 may make a decision only based on the route cost calculated by the route cost acquiring section 36 without the measuring section 33.

Also, in the mobile communication system shown in FIG. 2, such a configuration is shown that the route cost acquiring section 36 acquires the route cost from the router 40 in own home network HN. But the route cost acquiring section 36 may acquire the route cost from the router 40 in other foreign networks FN1 to FN3.

What is claimed is:

1. A home agent for receiving a communication packet sent out from a source terminal to a mobile terminal as a destination to transfer the communication packet to the mobile terminal connected to a foreign network, the home agent comprising:
- a measuring section that is configured to measure an amount of internal resources of the home agent;
- a deciding section that is configured to decide whether the amount of available internal resources is less than a threshold amount; and
- a requesting section that is configured to, based on the decision of the deciding section, send a request to the mobile terminal to request the mobile terminal to optimize a communication route such that the home agent is bypassed.

2. A mobile communication system for receiving a communication packet sent out from a source terminal to a mobile terminal as a destination to transfer the communication packet to the mobile terminal connected to a foreign network, the mobile communication system comprising:
- a home agent comprising:
    - a measuring section that is configured to measure an amount of internal resources of the home agent;
    - a deciding section that is configured to decide whether the amount of available internal resources is less than a threshold amount; and
    - a requesting section that is configured to, based on the decision of the deciding section, send a request to the mobile terminal to request the mobile terminal to optimize a communication route such that the home agent is bypassed; and
- a router that is connected to the home agent, the router comprising:
    - a memory that stores route management information; and
    - a route cost calculating section that is configured to calculate a route cost of a network based on the route management information,
- wherein the home agent requests the mobile terminal, based on at least one of the amount of internal resources and the route cost of the network, to bypass the home agent in performing communication with the source terminal.

3. The home agent according to claim 1, wherein:
the deciding section decides whether it is possible to make a new transfer, based on the amount of available internal resources; and
the requesting section requests the mobile terminal, based on the decision of the deciding section, to bypass the home agent in performing communication with the source terminal.

4. The home agent according to claim 2, wherein: the deciding section decides whether it is possible to make a new transfer, based on the amount of available internal resources; and the requesting section requests the mobile terminal, based on the decision of the deciding section, to bypass the home agent in performing communication with the source terminal.

5. The home agent according to claim 2, wherein:
the deciding section decides whether to switch a route based on the route cost; and
the requesting section requests the mobile terminal, based on the decision by the deciding section, to switch the route to bypass the home agent in performing communication with the source terminal.

6. A mobile communication system, comprising: a mobile terminal which performs a communication with the source terminal; a home agent which receives a communication packet sent out from a source terminal to a mobile terminal as a destination to transfer the communication packet to the mobile terminal connected to a foreign network, the home agent comprising: a measuring section that is configured to measure an amount of available internal resources of the home agent; a deciding section that is configured to decide whether the amount of available internal resources is less than a threshold amount; and a requesting section that is configured to, based on the decision of the deciding section, send a request to the mobile terminal to request the mobile terminal to optimize a communication route such that the home agent is bypassed in performing communication with the source terminal; and a router that is connected to the home agent, the router comprising: a memory that stores route management information; and a route cost calculating section that is configured to calculate a route cost of a network based on the route management information; and wherein the home agent requests the mobile terminal, based on at least one of the amount of available internal resources and the route cost of the network, to bypass the home agent in performing communication with the source terminal, and the mobile terminal receives the request, and based on the request, bypasses the home agent in performing communication with the source terminal.

7. The mobile communication system according to claim 6, wherein:
the deciding section decides whether it is possible to make a new transfer, based on the amount of available internal resources.

8. The mobile communication system according to claim 6, wherein the home agent comprises: a route cost acquiring section which acquires the route cost, wherein the deciding section decides whether to switch the route based on the route cost acquired by the route cost acquiring section; and the requesting section requests the mobile terminal, based on the decision by the deciding section, to switch the route to bypass the home agent in performing communication with the source terminal.

9. The mobile communication system according to claim 6, wherein the mobile terminal comprises:
- a request receiving section which receives the request from the home agent; and
- a route optimizing section which selects an optimal communication route that bypasses the home agent in response to the received request.

10. The home agent according to claim 1, wherein the amount of internal resources comprise an amount of registers and an amount of memory that is being used by the home agent.

11. The home agent according to claim 10, further comprising:
- a transiting section that receives a packet and transfers the packet to the mobile terminal,
- wherein the amount of internal resources comprises an amount of resources consumed by the transiting section and an amount of resources consumed by processes for receiving a notice of care of address from the mobile terminal.

* * * * *